No. 873,760. PATENTED DEC. 17, 1907.
C. H. LATHAM.
MOLDING APPARATUS.
APPLICATION FILED MAR. 28, 1907.
2 SHEETS—SHEET 2.
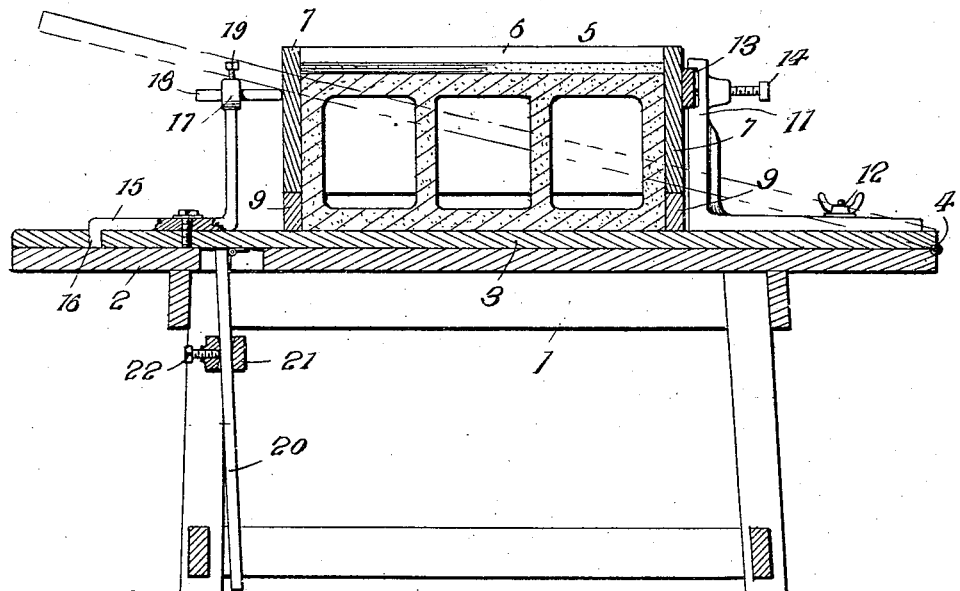
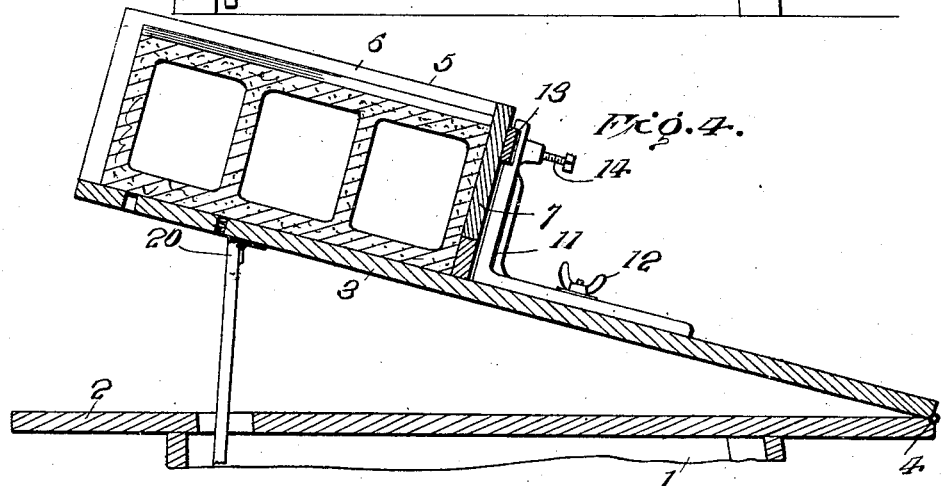
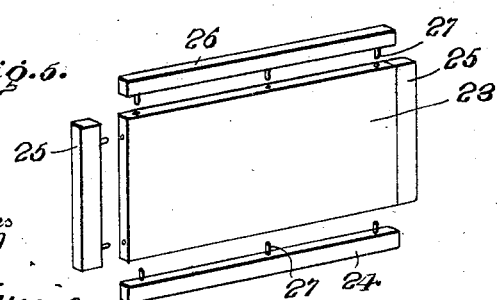
Inventor
C. H. Latham.
Witnesses
By
Attorneys

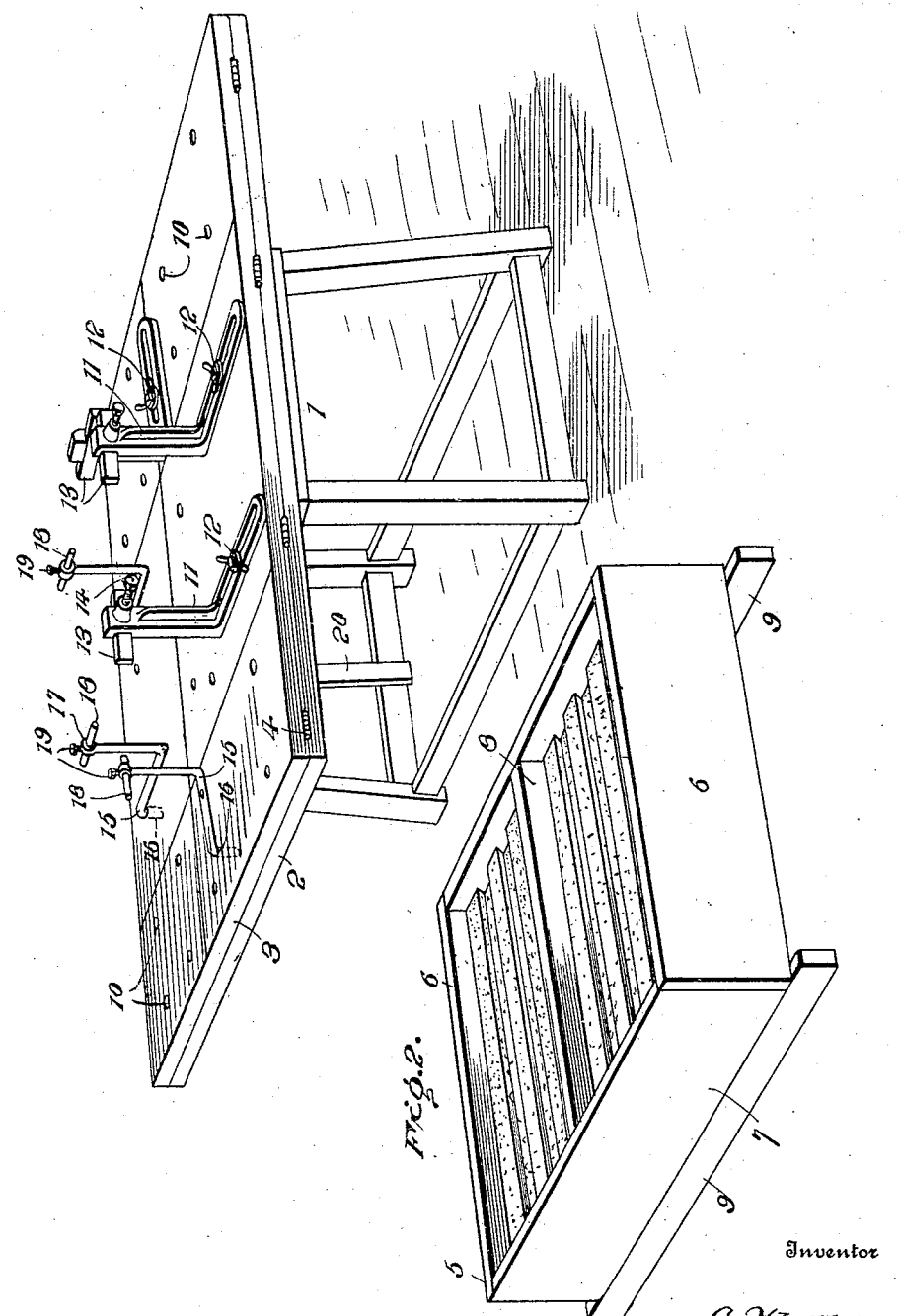

UNITED STATES PATENT OFFICE.

CHARLES H. LATHAM, OF BRADFORD, PENNSYLVANIA.

MOLDING APPARATUS.

No. 873,760.    Specification of Letters Patent.    Patented Dec. 17, 1907.

Application filed March 28, 1907. Serial No. 365,015.

*To all whom it may concern:*

Be it known that I, CHARLES H. LATHAM, citizen of the United States, residing at Bradford, in the county of McKean and State of Pennsylvania, have invented certain new and useful Improvements in Molding Apparatus, of which the following is a specification.

This invention contemplates certain new and useful improvements in molding machines or tables, particularly designed for blocks of concrete or similar plastic substances, and the invention is especially intended as a device or apparatus for use in facing hollow blocks or tiles, so that the same may be used as the outside layer or course for building walls, or for paving, the facing being provided with any desired configuration or representing natural stone work, or otherwise.

The invention consists in certain constructions and arrangements of the parts which I shall now hereinafter describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a perspective view of my improved mold table; Fig. 2 is a detail perspective view of one form of knock-down mold that may be employed to face the tiling, or the like; Fig. 3 is a transverse sectional view through the table with a mold thereon; Fig. 4 is a similar view illustrating the device arranged to face the end of a tile for use at the corner of a structure; and, Fig. 5 is a detail perspective view of a modified form of mold member.

Corresponding and like parts are referred to in the following description and illustrated in all the views of the drawings by the same reference characters.

Referring to the drawings, the numeral 1 designates the stand of the table, said stand being of any desired construction and dimensions. To the top 2 of the stand, the mold base 3 may be hinged at one edge, as indicated at 4. The molds themselves may be of any desired number, dimensions, and construction, and in the present instance I have shown the mold (see Fig. 2) as arranged for use with two tiles, although it is to be understood that any number of tiles may be faced on the table at one time. In the present instance, the mold embodies side members 6 and end members 7 with a partition 8 to form the two molds.

As illustrated in Fig. 2, the mold, in the present instance, is arranged so that the operator may apply a facing of cement or concrete upon a hollow building block with a dove-tailed side, although it is manifest that any form of tile may be treated. In order that the face may be formed with sharp or square cut edges, the mold members are so arranged that in taking apart the mold, they will be removed from the walls of the tile with a sliding action in planes parallel to the respective walls against which they lie. This is an important feature of my invention, for by so doing the edges will be left sharp and intact, and the operation will be expedited, because the mold members may be slipped away from the tile and its newly formed face before the latter is fully set. To accomplish this result by one combination of elements, the side members 6 are supported on the projecting ends of end strips 9, said end strips also supporting the end members 7, as clearly illustrated in Fig. 2. Hence, after the cement has been deposited within the mold, and smoothed with a trowel, or the like, it is obvious that the strips 9 may be pulled out in a longitudinal direction which will permit the mold members to slide downwardly and clear the newly formed face with a wiping action. Any height of mold member may be employed to secure a face of any desired depth, and it will be readily understood that the height of the strips 9 may be varied for the same purpose.

In order to securely hold the mold members in proper relation to each other upon the table, the base 3 may be formed with any desired number and arrangement of apertures 10 with which the clamps for the molds are designed for engagement. The clamps 11 at one side and end of the mold may be of the angular formation illustrated in Figs. 1, 3 and 4, their horizontal members being provided with longitudinal slots through which wing bolts 12 are fitted, said bolts extending through any of the holes 10 in the base. If desired, the vertical members of the clamps 11 may be formed with sockets on their inner faces, laterally extending strips 13 being held in said sockets and being adjusted against the outer sides of the mold members by means of binding screws 14, so as to obtain an additional binding action after the initial pressure or adjustment has been effected by means of the sliding engagement of the slotted clamps with the wing bolts 12. In the preferred arrangement the initial adjustment is obtained by these sliding clamps 11 at one side and end of the mold, after which complemental clamps 15 are brought into play, these latter are adapted to swing laterally over the table and are detachably held in the proper holes 10 by being provided at one end with downwardly projecting fingers 16 adapted to fit snugly in the holes. The opposite ends of the swinging clamps 15 project upwardly as shown and are provided at their upper extremities with sleeves 17 through which clamp rods 18 slide, said rods being held at the desired adjustment by means of set screws 19.

From the foregoing, it will be understood that after the mold has been set in place and the initial adjustment obtained by the sliding clamps 11, the swinging clamps 15 are moved laterally over the table so as to bind against the adjacent mold members and securely hold all the elements of the mold in proper operative position.

When the base 3 of the mold is hinged, it may be held at any desired inclination and in any desired manner. In the present instance, I have provided for this purpose a hinged strut 20 which is suspended from the base near the free end thereof and projects downwardly through a slot in the table top 2 and also through a slotted bearing 21 supported by a cross bar or in any desired manner in the stand 1. A set screw 22 works through the bearing and impinges against the strut so as to hold the base 3 at the desired inclination. Although this tilting of the base is not essential, it is useful under certain conditions, for instance in dressing or facing the end of a block or tile. When this operation is performed, the sliding clamps 11 are engaged with the base at such points that the mold when set up will be positioned near the free edge of the base, being back from the edge a distance equal to the desired depth of the facing that is to be formed on the end of the tile.

After the top of the tile has been faced, the end of the tile may also be faced by using a trowel board or the like (lying against the edge of the mold base) as the end mold member. Then the tile is slipped forwardly just over the edge of the base and it is evident that the operator may then slip the board downwardly past the edge to obtain the highly advantageous sliding or wiping action above referred to, that results in imparting a sharply defined edge to the end of the tile.

As has been above stated, the dimensions of the mold members may be increased by any desired means. As a concrete illustration of one means which may be employed, reference is to be had to Fig. 5, in which the mold member 23 is shown as provided with a bottom extension 24, end extensions 25, and top extensions 26, any or all of which may be employed according to the circumstances or the requirements of the case. These extension strips may be secured to the main member of the mold by dowels 27 or by any desired means.

Having thus described the invention, what is claimed as new is:

1. An apparatus of the character described, comprising a stand, a mold base mounted on the stand, a mold mounted on said base and consisting of knock-down members that are adapted to be separated by a sliding action in a plane parallel to the face of the article against which they are adapted to rest.

2. An apparatus of the character described, comprising a stand, a mold base mounted on said stand, a mold consisting of end and side members, strips 9 underneath and in line with the end members and provided with projecting ends supporting the side members in elevated position, and means for clamping the mold members together.

3. An apparatus of the character described, comprising a stand, a mold base mounted on said stand and provided with a plurality of holes, angular clamp members 11 mounted on said base and provided in their horizontal members with slots, adjusting bolts received in said slots and fitting in the holes of the base whereby the clamps may be slid longitudinally on the base and held in different adjusted positions, and complemental swinging clamps mounted on said base and adapted to face the sliding clamps.

4. An apparatus of the character described, comprising a stand, a mold base mounted on said stand and provided with a plurality of holes, clamps adjustably mounted on said base, and other clamps complemental to the first named clamps, said last named clamps being provided at one end with downwardly extending fingers adapted to take in any of the holes of the base and provided with upwardly extending opposite ends formed with collars, and clamping rods adjustably mounted in the respective collars.

In testimony whereof I affix my signature in presence of two witnesses.

CHARLES H. LATHAM. [L. S.]

Witnesses:
W. N. WOODSON,
FREDERICK S. STITT.